May 2, 1967  P. E. SMITH  3,317,658
CABLE SPLICE SPIDER
Filed June 7, 1966  2 Sheets-Sheet 1
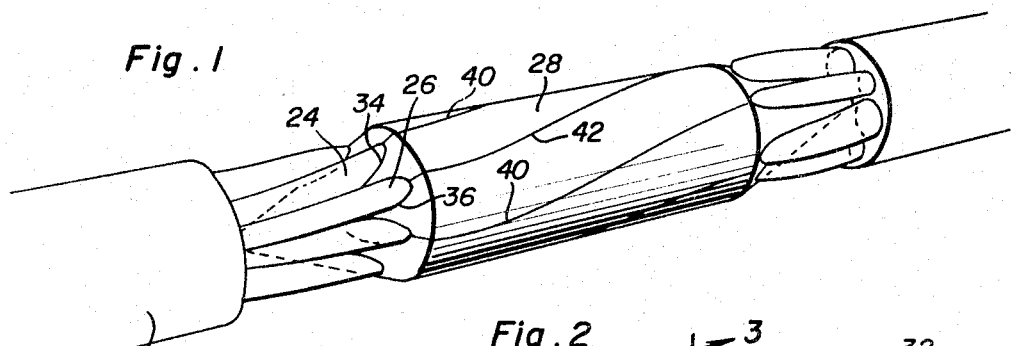
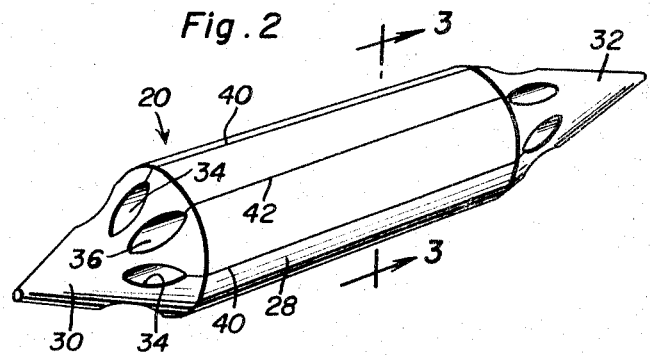
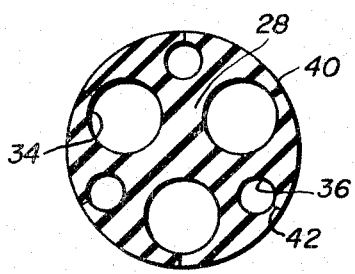
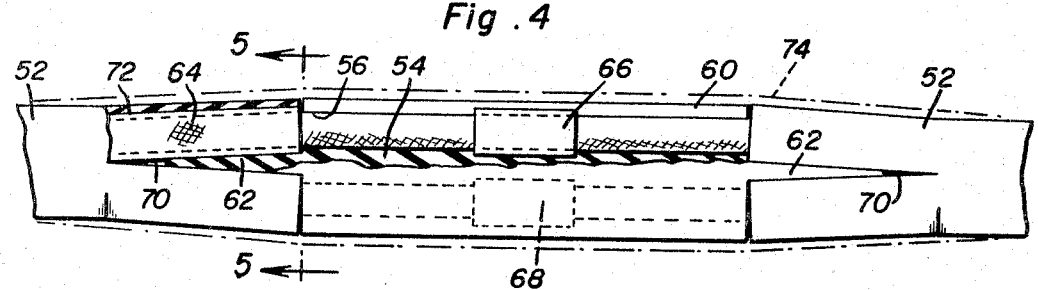
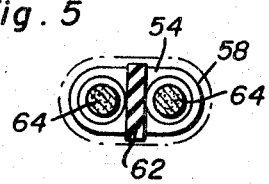
Pleasant E. Smith
INVENTOR.

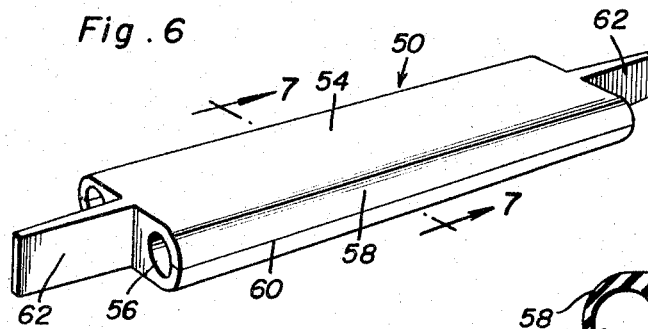
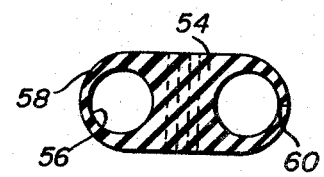
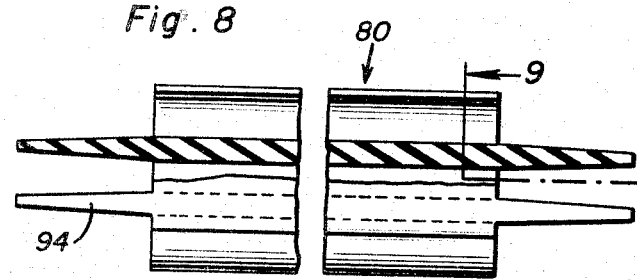
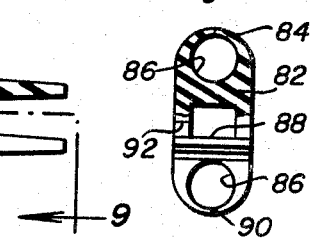
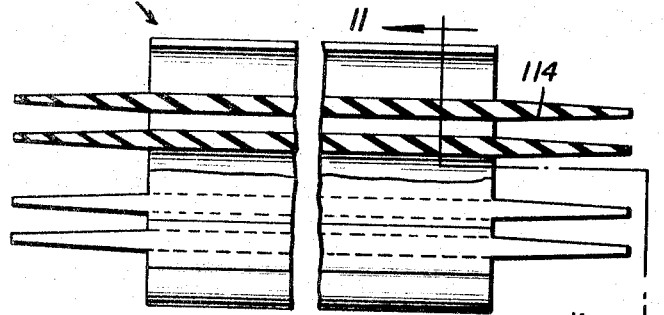
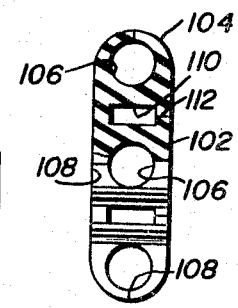
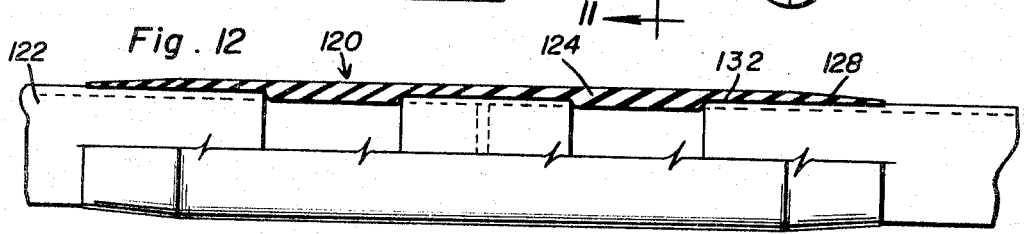
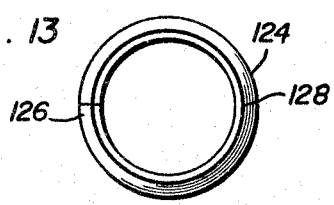
Pleasant E. Smith
INVENTOR.

United States Patent Office 3,317,658
Patented May 2, 1967

3,317,658
CABLE SPLICE SPIDER
Pleasant E. Smith, Carbondale, Ill., assignor of one-fourth to James A. Ozbourn, Carterville, one-fourth to Thomas A. Miller, Marion, and one-fourth to Wayne G. Lecocq, West Frankfort, Ill.
Filed June 7, 1966, Ser. No. 555,753
4 Claims. (Cl. 174—138)

The present invention generally relates to improvements in the methods and apparatuses employed in splicing conductor cables either of the single or multiple conductor type such as used to supply electric power to various machines and electrically powered equipment in mines, mills and various industrial plants and the like. More particularly, the present invention relates to a spider or separator used by the electrician when making a splice in the conductor and includes an elongated sleeve-like structure receiving the conductor and being constructed of an insulating material such as neoprene, rubber, plastic or other material depending upon the dielectric characteristics required.

In mining operations, various machines employed therein are provided with electric power cables which lie on the ground and frequently, heavy machinery runs over the cables, causing damage thereto and during normal use, the cable may become ruptured or severed. When this occurs, it is common practice for the electrician to provide a temporary splice in the cable in order to get the equipment back into service as quickly as possible inasmuch as considerable time is lost when any of the equipment is idle. In order to facilitate completion of the temporary splice in as short a time as possible but yet provide a secure and positive splice capable of withstanding relatively rough usage while still being inexpensive, the present cable splice spider has been provided which may be constructed for use with various types of cables such as a single conductor cable, a two conductor flat cable, a two conductor flat cable with one ground wire, a three conductor flat cable with two ground wires and a circular three conductor cable with three ground wires.

An object of the present invention is to provide a conductor cable splice spider that is constructed to conform to the particular cable it would be used with and many be employed with various assemblies of conductors having various voltages while employing the same principle of operation.

Another object of the present invention is to provide a cable splice spider which enables a quick and secure temporary splice for a single or multiple conductor portable electric power cables which enables the conductor splicing sleeve to be orientated in alignment with each other rather than being staggered as in a normal temporary splice thereby avoiding the possibility of forming one conductor shorter than the others which would place all of the tension on such short conductor when the cable is moved which is an existing problem with the present procedures in forming a temporary splice which sometimes causes the short conductor to break.

A further important object of the present invention is to provide a cable splice spider which is quite inexpensive to manufacture, requires less material to make inasmuch as the length thereof may be short for each splice and the time involved in applying the spider considerably reduces the time in forming a temporary splice thus rendering the spider of the present invention economically feasible.

Still another object of the present invention is to provide a cable splice spider which is constructed to enable the conductors to move in relation to the spider when the cable bends thus eliminating excessive tension being exerted on certain of the conductors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a cable splice spider for a round three conductor and three ground wire cables illustrating the association of the spider with the conductors and ground wire;

FIGURE 2 is a perspective view of the spider employed in FIGURE 1;

FIGURE 3 is a transverse, sectional view, taken substantially upon a plane passing along section line 3—3 of FIGURE 2 illustrating further structural details of this form of the invention;

FIGURE 4 is an elevational view of a two conductor flat cable spider illustrating the manner of use thereof;

FIGURE 5 is a detailed sectional view taken substantially upon a plane passing along section line 5—5 of FIGURE 4 illustrating the structural relationship of the spider to the conductors in the cable;

FIGURE 6 is a perspective view of the spider illustrated in FIGURES 4 and 5;

FIGURE 7 is a transverse, sectional view taken substantially upon a plane passing along section line 7—7 of FIGURE 6 illustrating further structural details of this form of the invention;

FIGURE 8 is a plan view, with portions broken away, illustrating a spider for use with flat cables having two conductors and a central ground wire;

FIGURE 9 is a transverse, sectional view taken substantially upon a plane passing along section line 9—9 of FIGURE 8 illustrating further structural details of this form of the invention;

FIGURE 10 is a plan view, with portions broken away, of a flat cable having three conductors and two ground wires interposed between;

FIGURE 11 is a transverse, sectional view, taken substantially upon a plane passing along section line 11—11 of FIGURE 10 illustrating further structural details thereof;

FIGURE 12 is a plan view of a single conductor cable and a spider associated therewith with portions broken away to illustrate the relationship; and FIGURE 13 is an end view of the spider employed with the single conductor cable illustrated in FIGURE 12.

Referring now specifically to the drawings, FIGURES 1–3 illustrate a multiple conductor spider or separator generally designated by the numeral 20 which is used with a circular cable 22 having three conductors 24 and three ground wires 26 orientated in alternating relation to each other. The spider 20 includes an elongated body 28 of insulating dielectric material such as neoprene, rubber, plastic or the like. Each end of the body 28 is smoothly and uniformly tapered as at 30 and 32 with the central portion of the body being circular in cross-section as illustrated in FIGURE 3. Extending longitudinally through the body 28 is three large cavities 34 receiving the conductors 24 and three smaller cavities 36 receiving the ground wires 26. Each of the cavities 34 and 36 are circular in cross-sectional configuration and are staggered in relation to each other as illustrated in FIGURE 3.

Each of the larger cavities 34 have the outermost portions of the peripheries thereof spaced from the outer wall of the body 28 and is communicated therewith by a longitudinal slit 40 which enables the conductors 24 to be inserted into the cavities 34. Likewise, the cavities 36 have the outermost portions thereof spaced from the periphery of the body 28 and are communicated therewith by slits 42 which enable insertion of the ground wires 26 into the cavities 36. The cavities and slits may be straight longitudinally of the body or may be spirally arranged to conform with the orientation of the conductors and ground wires in the cable 22. The body 28 may also be sufficiently flexible and resilient to enable the body to torsionally twist to enable the cavities and the slits to become spirally arranged even though they may have been initially formed longitudinally straight.

FIGURES 4-7 illustrate a spider 50 for use with a two conductor flat cable 52 as illustrated in FIGURE 4. The spider 50 includes an elongated flat body 54 generally conforming in shape and configuration to the conductor 52. The body 54 has a pair of longitudinally extending cavities 56 extending therethrough with the outermost portion of each cavity 56 being spaced from the curved side walls 58 of the body 54 and being communicated therewith by the provision of a longitudinal slit 60. Extending axially from each end of the body 54 is a breaker strip or tongue 62 which tapers towards the outer end thereof and which is parallel to the longitudinal axis of the cavities 56. The top and bottom edges of the breaker strip form extensions of the top and bottom surface of the body 54 and the end edge of the breaker strip 62 is perpendicular to the top and bottom edge thereof. The body 54 and breaker strip 62 are of unitary construction and are constructed of suitable insulating dielectric material such as neoprene, rubber, plastic and the like.

As illustrated in FIGURES 4 and 5, the cable 52 has a pair of insulated conductors 64 therein with the conductors being axially electrically connected by sleeves 66 and 68 which are also received in the cavities 56 and which may partially embed in the material from which the body 54 is formed. The breaker strips 62 separate the insulating conductors 64 and also separate a slit 70 formed in the insulating material 72 on the cable 52. After the spider is in place, suitable insulating tape 74 is wound around the temporary splice to seal the splice and otherwise complete the splice in a normal manner.

FIGURES 8 and 9 illustrate a cable splice spider 80 for use with a flat cable having two conductors and one ground wire with the spider generally being designated by the numeral 80 and including an elongated generally flat body 82 having rounded side edges 84 and a pair of cavities 86 extending longitudinally therethrough for receiving the conductors. Centrally between the cavities 86, the longitudinal cavity 88 is provided for receiving a ground wire. The cavities 86 are spaced from the rounded exterior surface 84 of the body 82 and each of the cavities 86 is provided with a radial slit 90 extending through the surfaces 84 to permit entry of a conductor into the cavity. The cavity 88 is provided with a corresponding slit 92 communicating with the exterior surface thereof at one side of the body 82 for enabling entry of a ground wire into the cavity 88.

Extending longitudinally from each end of the body 82 is a pair of generally parallel breaker strips 94 which taper outwardly and have edge surfaces thereof corresponding with the thickness of the body 82 and the inner surfaces of the breaker strips or tongues 94 merge into and form an entrance to the central cavity 88 while the outer surfaces thereof are generally tangential to the innermost portions of the cavities 86 as illustrated in FIGURE 9 as well as FIGURE 8. The cavity 88 may be in any suitable configuration for receiving ground wire and the breaker strip 94 separates the conductors from the ground wire in much the same manner as the breaker strip 62 illustrated in the embodiment of the invention illustrated in FIGURES 4-7.

FIGURES 10 and 11 illustrate another embodiment of the invention generally designated by the numeral 100 which is for forming a splice in a three conductor two ground wire flat cable. The spider 100 includes a body 102 which is elongated and generally flat and provided with rounded edges 104. Extending longitudinally through the body 102 is three longitudinal cavities 106 for the conductors with the cavities 106 being equally spaced from each other and each cavity having an entrance slit 108 provided therein for enabling insertion of a conductor therein. Interposed alternately between the cavities 106 is a pair of ground wire cavities 110 each of which has an entrance slit 112 to enable insertion of the ground wire into the cavity 110. Extending axially from each end of the body 102, is a plurality of breaker strips 114 each of which is tapered and which are orientated in pairs on each side of each cavity 110 with the outer surfaces thereof tangential to the conductor cavities 106 and the inner surfaces thereof merging into the surfaces of the ground wire cavities 110.

FIGURES 12 and 13 illustrate a cable splice spider 120 for a single conductor cable 122 of circular configuration and includes a cylindrical hollow body 124 having a radial entrance slit 126 therein.

The ends of the body 124 are tapered or beveled on the outer surface as indicated by numeral 128 and when the conductor 122 is inserted into the body 124, the connecting sleeve 130 may actually embed into the surface of the body 124 as may the insulating material 132 on the metallic conductor 122.

In the multiple conductor spider, the cable splice may be formed with the cable connecting sleeves alongside or of in alignment with each other rather than being placed in staggered relation as is the situation in a conventional temporary cable splice. For example, when a multiple conductor cable is temporarily spliced together, the jacket of insulating material is removed for approximately 15 inches from the ends thereof thus exposing the conductors for approximately 15 inches. The conductors are then cut to length and connecting sleeves are crimped on or soldered on the ends of the conductors thus joining the conductors. Insulation tape is then applied to the conductors. In order to retain the conventional splice as small as possible when using the insulating tape on each conductor, the sleeves are orientated in staggered relation inasmuch as after all of the sleeves have been placed on position, the entire splice has to be covered with a tape. In distinction to this, the present invention enables a temporary splice with all of the conductors being exposed a relatively short distance with the connector sleeves between the exposed conductors being disposed in alignment with each other with the spider serving to insulate the conductors from each other and also space the conductors from each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cable splicer spider for use in joining the adjoining ends of a conductor cable carrying at least two conductors, comprising an elongated body of flexible non-conductive material, said body having opposing flat end portions disposed generally perpendicular to the longitudinal axis of the body, said body being provided with an external surface and having at least two axially extending cavity forming bores, said bores opening through the end portions and being separated in their entire extent through the body, said body having a longitudinal slit for each bore extending longitudinally from one end portion to the other end portion, each slit communicating its bore with the exterior surface of the body for a lateralwise insertion of a conductor into the associated bore, said end portions having axially projecting flat strip-like tongue extensions tapered in an outward direction and terminating in free substantially pointed outer ends with the extensions lying in a longitudinal plane transversely intersecting the longitudinal planes through the body and end portions in which the bores lie so that said extensions separate the conductors as they extend into the adjoining ends of the cable to be spliced.

2. The invention of claim 1 wherein said body is generally flat and has opposing flat sides and the end-portions are substantially normal to the sides with the tongue-like extension strips disposed transversely of the sides and the bores being formed in the body on opposite faces of the strips, each strip tapering outwardly along the face surfaces thereof with the edge surfaces of the strip being parallel with the sides of the body.

3. The invention of claim 1 wherein said body includes a plurality of cavity forming bores, each bore having a slit extending through the sides of the body, said bores being adapted to receive conductor wires and a ground wire and the end portions being provided with the extension strips in a manner so that the strips are interposed between each bore so as to separate the conductors from the ground wires.

4. The invention of claim 3, wherein said extension strips have outer surfaces tangential to the conductor bores and inner surfaces merging into the surfaces of the ground wire bore.

References Cited by the Examiner

UNITED STATES PATENTS 2,267,630   12/1941   Weiland.
2,639,312   5/1953   Kerwin _____ 174—88 X

FOREIGN PATENTS 406,410   3/1934   Great Britain.
505,013   5/1939   Great Britain.

LARAMIE E. ASKIN, *Primary Examiner.*